United States Patent [19]

Davis et al.

[11] Patent Number: 5,575,242
[45] Date of Patent: Nov. 19, 1996

[54] ANIMAL CONTROL SYSTEM

[76] Inventors: James E. Davis, 26 Austin Rd., Wilmington, Del. 19810; Byron H. Rubin, Honeoye Falls, Monroe, N.Y. 14472

[21] Appl. No.: 201,215

[22] Filed: Mar. 21, 1994

[51] Int. Cl.$^6$ ............................ A01K 15/02; G08B 21/00
[52] U.S. Cl. .............................. 119/721; 340/573
[58] Field of Search .................... 340/573, 572, 340/540; 119/721, 720, 719

[56] References Cited

U.S. PATENT DOCUMENTS

| | | | |
|---|---|---|---|
| 3,753,421 | 8/1973 | Peck | 119/29 |
| 4,136,338 | 1/1979 | Antenore | 340/551 |
| 4,675,656 | 6/1987 | Narcisse | 340/539 |
| 4,898,120 | 2/1990 | Brose | 340/573 |
| 4,967,695 | 11/1990 | Giunta | 119/29 |
| 5,067,441 | 11/1991 | Weinstein | 119/29 |
| 5,121,711 | 6/1992 | Aine | 340/573 |
| 5,381,129 | 1/1995 | Boardman | 340/573 |

*Primary Examiner*—Gene Mancene
*Assistant Examiner*—Thomas Price

[57] ABSTRACT

There is described a system for controlling the movement of an animal relative to a controlled area delineated by a wire loop antenna. The controlled area may be inclusive or exclusionary. A frequency modulated signal is transmitted by the FM transmitter connected to the loop. An FM receiver attached to the animal detects the transmitted signal and provides an alarm signal to the animal. The loop antenna is untuned. Low radio frequencies are used and the carrier frequency deviation is large to reduce the systems susceptability to noise. The modulating frequency is limited, also to reduce susceptibility to noise. Integrated circuits are especially designed to permit operation with very low power.

12 Claims, 5 Drawing Sheets

ANIMAL CONTROL SYSTEM

FIELD OF THE INVENTION

This invention relates to a system for controlling the movement of an animal relative to a controlled area. The controlled area is delineated by a wire loop attached to a transmitter transmitting a frequency modulated (FM) signal to a receiver carried by the animal. The system may be either inclusionary or exclusionary with respect to the controlled area.

BACKGROUND OF THE INVENTION

There are many occasions when the owners of small animals desire to retain the animal within an area or to exclude the animal from a particular area. Devices of this type are available on the market and are often called an "electronic fence". In the case of pets, which are to be included within or excluded from a controlled area, it is desirable to have a simple system that operates effectively free of normal electrical interferences found in homes and the like. It is also desirable to have a system that is small, lightweight and operates at low power to give good battery life. Inclusionary areas may be a yard, for example. Exclusionary areas may be rooms, beds, tables, chairs, sofas and the like.

Many systems of this general type for either including or excluding animals have been disclosed by the prior art. For example, Peck, (U.S. Pat. No. 3,753,421) discloses a signal emitting wire antenna that delineates an area with respect to which the animal could be included or excluded. The animal wears a receiver and physical effect producer on a collar. The signal emitted by the antenna wire is a modulated alternating current in the sub-broadcast band, i.e., below 560 kHz. The strength of the signal field at the receiver depends on the proximity of the receiver to the antenna. A mild electrical shock (a physical effect) is generated to control the animal and is proportionate to the field strength. Unfortunately the Peck system is sensitive to the orientation of the receiver antenna relative to the wire and may lead to loss of signal. The animal can learn to orient the collar so as to avoid the shock while crossing the wire antenna. Also, the Peck system, especially the transmitter, requires relatively high power to operate and is not amendable to sustained battery operation.

This orientation sensitivity is alleviated to some extent by Giunta (U.S. Pat. No 4,967,695) who teaches a use of multiple antennas and receivers and the selection of the largest magnitude signal received. Unfortunately such circuitry adds to the complexity of the system and increases its power consumption considerably. The transmitter also requires relatively high power to operate.

An alternate system is disclosed by Weinstein (U.S. Pat. No. 5,067,441) who uses multiple antennas of the magnetic loop (ferrite core) variety. The transmitting loop is a central antenna which produces a radiation lobe characterizing the area in which the animal is to be constrained as contrasted to the wire perimeter type loop of the prior art. Weinstein measures the vector sum of the signals from multiple receivers to derive the magnitude of the field strength vector. Such a system is rather complex as it computes the RMS value of the audio beat frequency and then squares the value before adding the component signals. This system also is power consumptive.

None of these prior art systems use FM. These prior art systems appear to have used amplitude modulation (AM) because of its perceived simplicity and minimal circuitry associated with the low power needed for the collar batteries. One of the conventional advantages of FM is the static-free reception. While that is true when the signal is above some threshold, just below that threshold the received signal is very noisy. In this application it is expected that the animal will challenge the zone of the fence or that the excess noise might trigger inappropriate alarms. This would have unfortunate consequences for the uniform training of the animal. These problems make the advantages of FM to an animal confinement and control system not straightforward and apparently caused dismissal of the concept before the salient advantages were discovered.

Most of these prior art systems require substantial power for the transmitter and must be attached to a conventional power outlet in the home. Such power requirement renders the transmitter stationary, since it is attached to a power cord, and involves potentially lethal voltages which can be dangerous to the animal as well as the human operator. Another problem with such electronic fences is that they are not readily attachable to moveable objects such as beds, tables, chairs, sofas, or other animals for that matter. Attachment of the electronic fence to an animal would permit that animal to be protected from other animals in the same household.

SUMMARY OF THE INVENTION

This invention overcomes many of the deficiencies of the conventional animal confinement and control systems. The system of this invention controls the movement of a first animal relative to a controlled area. The system has a first transmitting antenna associated with the controlled area, a first radio frequency transmitter for generating radio frequency signals coupled to the antenna for radiating such signals, a first radio frequency receiver adapted to be placed on the animal for receiving such radiated signals, and an alarm means coupled to the first receiver that is responsive to the received radiated signal for producing a warning signal to the first animal. The system is improved by this invention wherein the first transmitter is an FM transmitter having a carrier frequency fc that is modulated by an audio frequency fa, the first receiver is an FM receiver adapted to detect the modulating frequency fa of the radiated signal, and the alarm means is responsive to the detected modulating frequency fa to produce such warning signal. The first transmitting antenna is a wire loop which delineates the controlled area.

In a preferred form of the invention, the transmitting antenna is a single-turn conductor delineating the controlled area. Typically the system will operate with a carrier frequency in the range of 10 kHz to 500 kHz, preferably in the range 20 kHz to 45 kHz, in order to reduce the system's susceptibility to interfering noise from household sources and yet operate at low power. The frequency deviation of the carrier frequency is selected to be in the range of 1 to 50%, preferably in the range of 10 to 30%, thereby to reduce further the susceptibility of the system to noise interference. Frequency deviation is defined as the maximum change in the carrier frequency divided by the carrier frequency in the absence of modulation, expressed as a percent. The receiver does not require accurately controlled modulation and carrier frequencies. Preferably the transmitting antenna outlet is untuned, thus facilitating installation.

The system may be adapted to control the movement of the first animal with respect to a second animal which is to be protected. In this adapted system, the first transmitter and first antenna are adapted to be placed on the second animal which then becomes an exclusionary controlled area. The first receiver has an alarm means that is responsive to the signal received from the first transmitter for producing a warning signal to the first animal when it is in proximity to the second animal.

In one embodiment of the invention, the first receiver has an integrated circuit FM detector comprising a phase locked loop (PLL) which includes a voltage-controlled oscillator and a phase comparator whose output is coupled to the voltage controlled oscillator, the phase comparator being coupled to compare the received radiated signal to the output of the voltage controlled oscillator, thereby to recreate the modulating audio frequency fa.

In another embodiment of the invention, the first transmitter is an integrated circuit PLL comprising an Exclusive OR (XOR) gate phase detector, having a Schmitttrigger input and a voltage controlled oscillator operating at a carrier frequency fc and means for connecting the XOR gate as an astable oscillator operating at an audio frequency fa, the XOR gate being connected to frequency modulate the voltage-controlled frequency fc with said audio frequency fa, thereby to produce the FM signal. This first transmitter requires relatively little power to operate, hence is amenable to battery operation.

The advantages of this invention are many. It is simple and easy to install and is designed to use low power transmitters and receivers. This system has lightweight components and may be attached to any objects moveable or stationary and is typically battery operated. It may be used with multiple transmitters and multiple receivers and may be used to exclude or include the animals with respect to a controlled area. The system is less subject to interference from noise components, because of its operating frequency and its high frequency deviation.

BRIEF DESCRIPTION OF THE DRAWINGS

The following description of this invention will be better understood when read in the conjunction with the accompanying drawings in which like reference numerals refer to like objects and in which.

DETAILED DESCRIPTION OF THE PREFERRED EMBODIMENT

Figure 1:
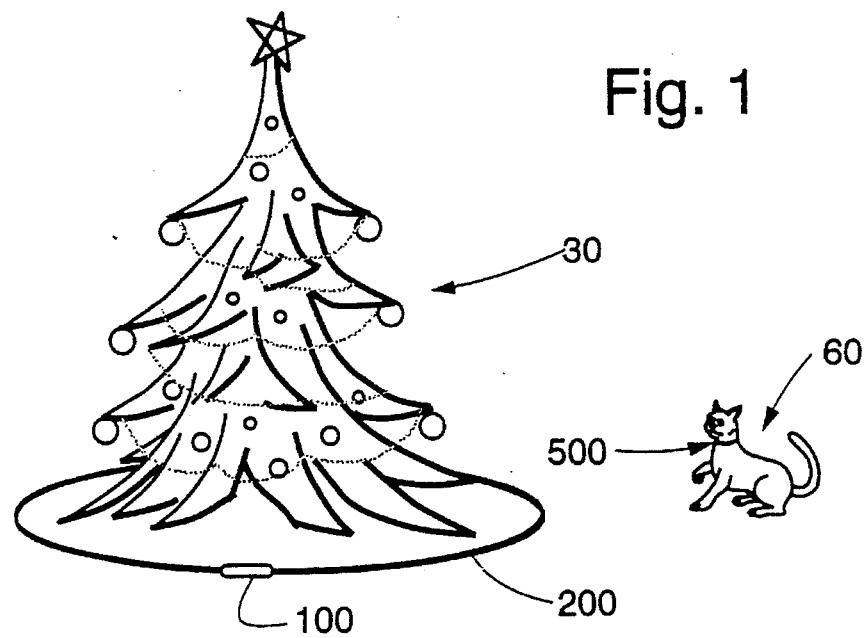
FIG. 1 is a pictorial view of the animal control system of this invention.

FIG. 1 is a diagrammatic illustration of a typical application of the system of this invention operating in an exclusionary mode. Thus if an object or thing, such as a Christmas tree, 30 in a house is desired to be protected from an animal such as a cat 60, a radio frequency transmitter 100, which is adapted to generate an FM signal, is connected to a wire loop antenna 200 for radiating such signal. The antenna 200 is positioned to surround, and thereby delineate, the object 30 which is to be protected. A corresponding radio frequency FM receiver 500 that is battery operated is positioned on the neck of the animal to be excluded. An alarm mechanism (not shown) is coupled to the output of the receiver 500 and is responsive to the received radiated signal for producing a warning signal. If the animal comes within a finite range of the antenna 200, it will receive the warning signal. This warning signal may be in the form of an audible sound or an electric shock provided by electrical contacts (not shown) contacting the neck of the cat. The various alarm mechanisms are well known in the art and need not be described further.

Figure 2:
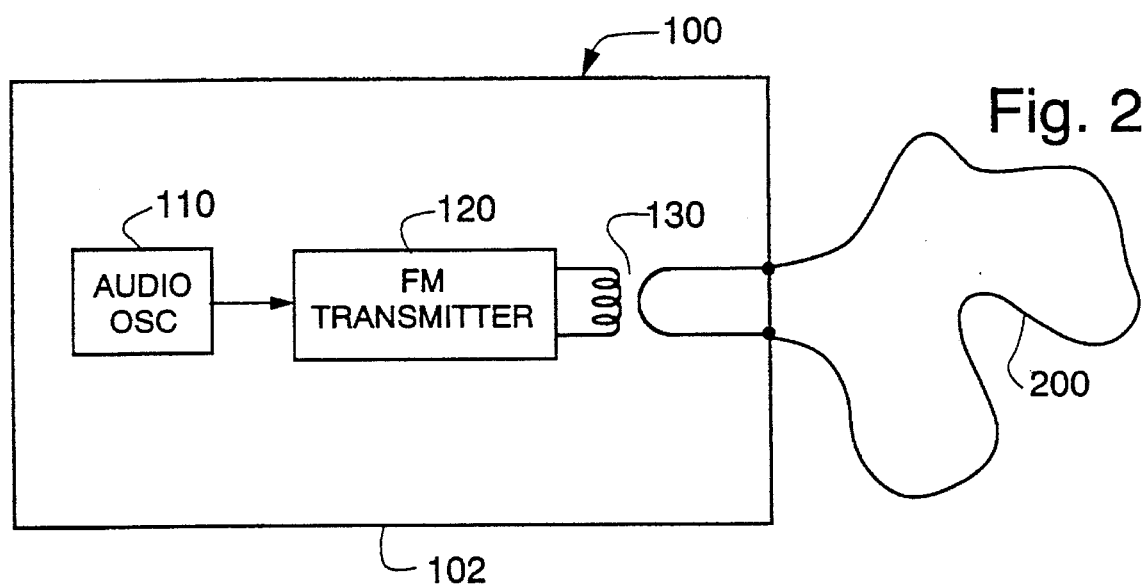
FIG. 2 is a block diagram of a transmitter that may be used in the system of FIG. 1.

FIG. 2 depicts the components of the transmitter 100 together with its wire loop antenna 200. The transmitter 100 is housed within a protective housing 102 and is operated preferably by a battery (not shown) positioned within the housing. Alternatively, of course, the transmitter 100 may be powered by an electrical cord to the household electric supply. A battery, however, is preferred because of its ease of use and the lack of lethal voltage dangers. The transmitter 100 comprises an FM transmitter 120 which is frequency modulated by an audio signal fa generated by an audio generator 110. The output of the FM transmitter 120 is coupled to a wire loop antenna 200 through an impedance matching transformer 130. The FM transmitter 120 is designed, as will be described, to operate without additional tuning for a wide range of reflected impedance permitting variable sizes and configurations of the wire loop antenna 200.

A feature of this invention is the broad band tuning circuits which allow ordinary tolerance components to be used. Further, the wire loop antenna 200 may be sized up to a configuration approximately 10 to 10000 cm in diameter, at the convenience of the pet owner. The wire loop may be laid out in a complicated geometric shape as desired by the pet owner. The preferred frequency fc of the FM carrier is in the sub-broadcast range, 10 kHz to 500 kHz; preferably the carrier frequency is in the range 20 kHz to 45 kHz. This preferred range avoids the strong harmonics of the household power line and of the television horizontal frequency, approximately 15750 Hz, and its third harmonic, approximately 47250 Hz. The horizontal sweep frequency of personal computers is a potential problem, too. The preferred frequency range can be generated and received with low power circuitry. These frequency ranges permit the use of low power circuitry since the high frequency gain of transistors falls as the collector or drain current is reduced and the dissipation of CMOS digital circuits is proportional to the frequency.

The frequency deviation fd of the FM transmitter 100 is large, preferably 1 to 50%, more preferably 10 to 30%, so that the resultant frequency spectrum is spread over a wide band. The wide band assures that very little power is present at any one frequency, so that this transmitter is less likely to interfere with other sub-broadcast systems. Furthermore, other fixed frequency sources, including other dog systems, may inadvertently have some FM character to their signal, but it will not be broad band and is easy to discriminate against in the receiver. While other sub-broadcast sources may be detected by this system, no stimuli will be generated because of this system's further requirement of radio frequency (RF) amplitude and frequency of modulation. The major consequence of the detection of other sub-broadcast sources is the increased power consumption caused by activating the PLL, described below, and possibly blinding the FM receiver to the signal from the transmitter 100.

The frequency of the audio generator of the transmitter 100 is preferably in the range 100 Hz to 10 KHz; more preferably in the range 500 Hz to 2000 Hz. Higher audio frequencies are preferred because the time response of filters in the receiver is inversely related to the audio frequency. However, too high of an audio frequency places difficult demands on the receiver detector in terms of its response or tracking. There may be only 20 cycles of carrier during one cycle of a 1500 Hz audio. Reducing the number of cycles of carrier per cycle of audio makes it difficult to separate the carrier frequency and its harmonics from the detected audio.

The transmitter 100 is preferably battery powered. For example, dry cell batteries, preferably of the alkaline-manganese dioxide type, may be used. This type cell is economical. Other cells may be used, including rechargeable types. Also, solar cells may be used to recharge the cells thus reducing the need to replace the batteries.

Figure 3:
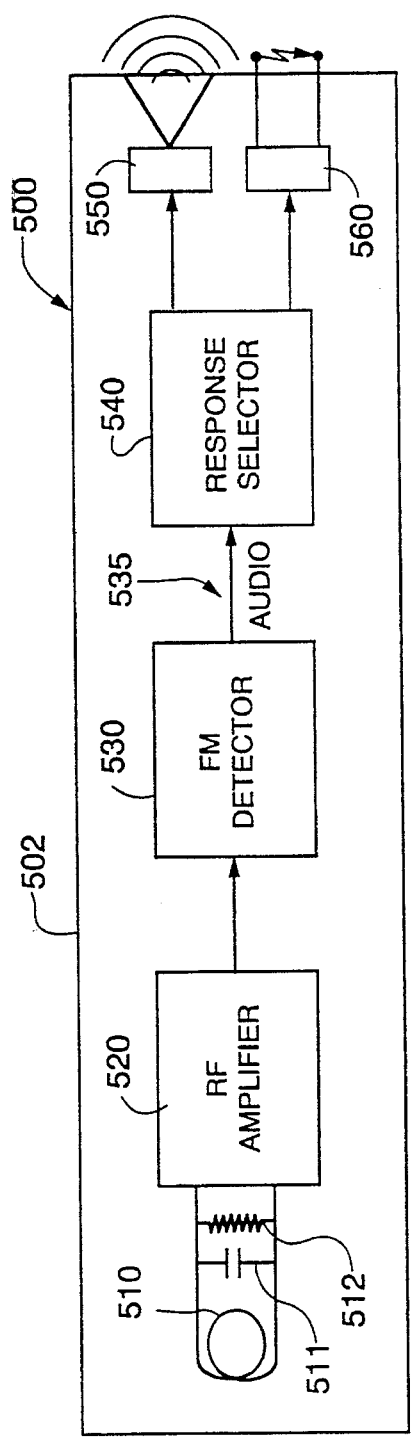
FIG. 3 is a block diagram of a receiver that may be used in the system of FIG. 1.

FIG. 3 shows the receiver 500 to be attached to the animal to be excluded from or included within the protected area delineated by the antenna 200. The receiver 500 preferably is lightweight and battery powered to facilitate its mounting, even on small animals such as cats, lap dogs, weasels and the like. The receiver 500 includes a housing 502 that contains a receiving antenna 510. The housing 502 may be attached to the animal by any means known, preferably in the form of a collar. The antenna 510 is preferably an inductive pickup coil, tuned by capacitor 511, and its bandwidth is controlled by a resistor 512. The inductive pickup coil comprises a multiturn coil, for example 1000 turns of No. 40 gauge copper wire. The combination of elements 510, 511 and 512 comprises a broad band tuned circuit and is connected to an RF amplifier 520 which is designed to provide sufficient gain, typically 100, to activate an FM detector 530 which demodulates the modulated carrier to provide a demodulated audio signal. Because the signal strength from the inductive loop 511 is proportional to the area of the loop, additional gain from the RF amplifier 520 may be required as the inductive loop is further miniaturized. The demodulated audio signal 535 from the FM detector 520 is coupled to a response selector 540.

The response selector 540, based on the audio frequency 535 received, selects among the various stimuli for affecting the movement of the animal with respect to the controlled area. This stimuli may be, for example, a noise generator in the form of an taudio transducer 550 or an electrical shocker 560, or both. A time delay may be applied between the noise alarm and the electric shock. These stimuli generators are well known in the art and need not be described further. For example, stimulators of the type described in U.S. Pat. Nos. 4,202,293, 4,802,482 or 5,054,428 may be used. Preferably, the entire receiver 500 is powered by a power supply (not shown) comprising a battery, preferably a lithium cell. The lithium cell has a high energy density that makes it suited to lightweight applications. A single lithium cell also provides sufficient voltage for CMOS integrated circuits which typically require 3 volts or more.

Figure 4:
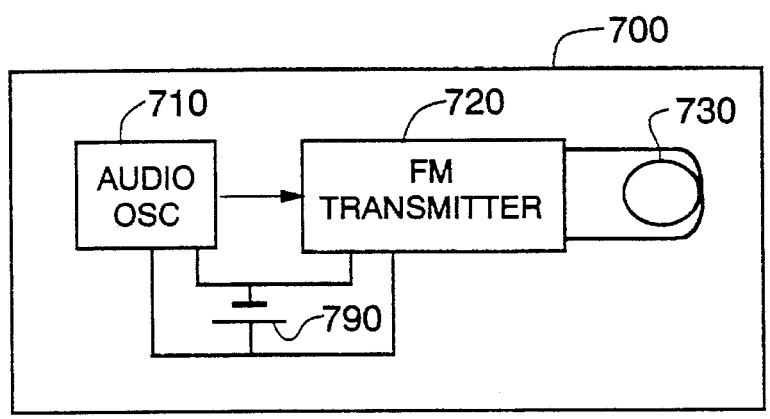
FIG. 4 is a block diagram of a transmitter that may be used in the system of FIG. 1.

FIG. 4 shows another embodiment of the invention in which a protective transmitter 700 intended to be placed on the neck of a second animal, such as a female cat, to be protected from a first animal, such as a male cat, upon whose neck is placed a receiver 500. If the first animal approaches the second animal too closely, then the warning stimuli is given to the first animal. It may be desired to use the electric shock stimuli to the neck without additional audio alarms in this particular application. The protective transmitter 700 may be essentially the same as the transmitter 100, and includes an audio generator 710 like audio generator 110 and FM transmitter 720 like FM transmitter 120 but differs in that elements 710 and 720 are positioned in a housing 702 suitable to be mounted on the second animal. Preferably the power supply 790 comprises a battery such as a lithium cell. Further, the transmitter 700 has an antenna 730 which is preferably an inductive loop similar to the antenna 200, but in this case comprising sufficient turns to impedance match the transmitter without an intervening transformer. Doubling the number of turns will raise the impedance level by four and decrease the power drawn by four, provided the drive voltage remains constant. Thus a sufficient number of turns can be calculated to produce the desired power output.

Transmitter 100

Figure 5:
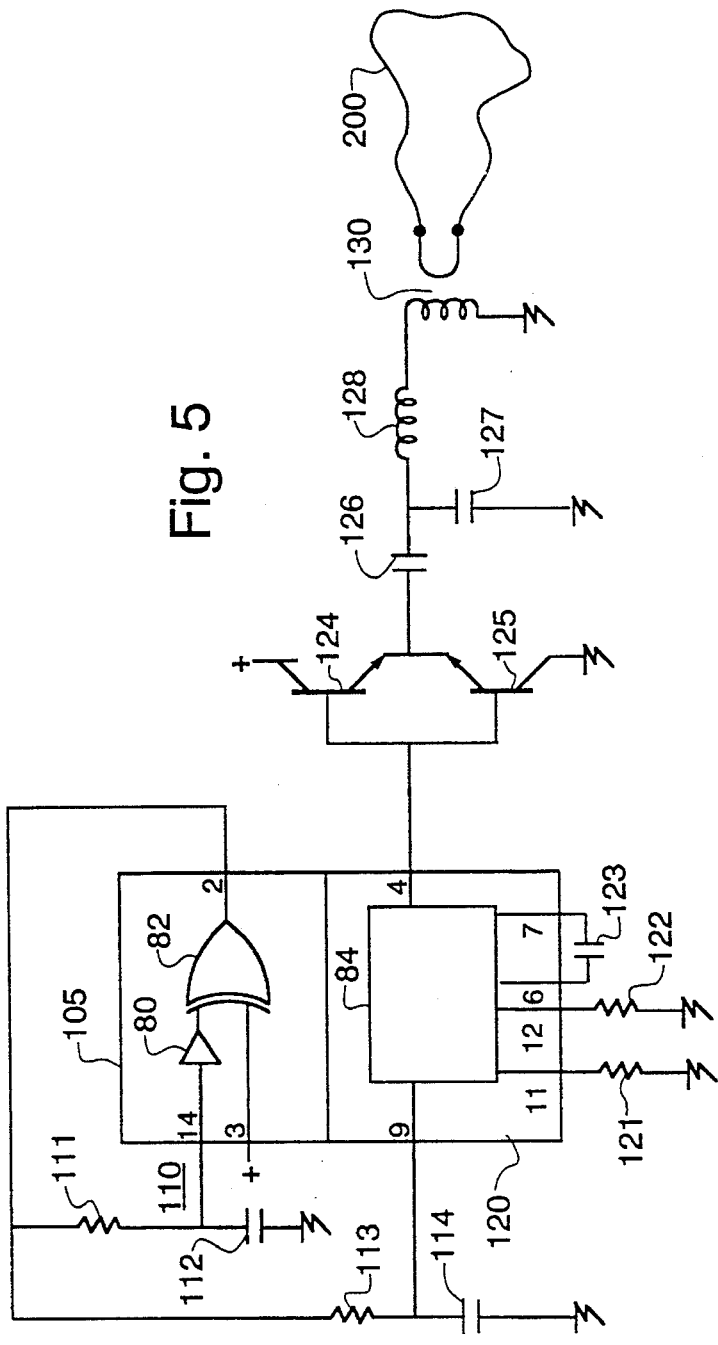
FIG. 5 is a partial block and partial schematic diagram of an integrated circuit PLL that may be used in the circuitry of the transmitter of FIG. 2.

Having thus described the overall protective system, the details of some of the preferred circuits will now be shown and described. FIG. 5 is a partial block and partial schematic detail of FIG. 2 which includes the audio generator 110 and transmitter 120. The audio generator 110 (FIG. 2) is formed by an unconventional use of the phase comparator portion of an integrated circuit 105 such as a CD4046B, which is a phase locked loop (PLL). The circuit 105 includes a phase comparator (type 1) of the XOR type, 82, which has a "Schmitt trigger" 80 on its input and is configured to give a phase reversal between its input and output, i.e., an inverting gate. These elements 80, 82 are connected as an astable RC oscillator which drives the voltage controlled oscillator (VCO) 84 of the PLL circuit 105. Thus input 9 (to the VCO 84) of the integrated circuit 105 is connected through a capacitor 114 to ground and through a resistor 113 to output 2 to supply the audio fa from the adapted phase comparator 82 of the PLL 105. Output 2 also is connected through a resistor 111 to input 14 and through a capacitor 112 to ground. Input 3 is connected to a voltage supply.

In this implementation of the audio generator 110, suppose the output of the XOR 82 output goes high, the resistor 111 will charge the capacitor 112 until the voltage across the capacitor is sufficient to trip the Schmitt trigger 80, causing the output to go low. The resistor 111 now discharges the capacitor 112 until the lower trip of the Schmitt-trigger is reached and the XOR output goes high, repeating the cycle and producing a square wave output. The RC time constant may be chosen to give an audio frequency of nominally 1 kHz. The squarewave output is passed to an RC low pass filter 113, 114 to remove the high frequency components to give a waveform approaching a sine wave. A smoother waveform is desired in this application to minimize the tracking requirements of the receiver. Alternatively, a phase shift oscillator (three RC filters between output and input) might be used to configure the XOR to supply the audio to the FM transmitter.

The FM transmitter 120, as described above, is seen to have input 11 of the circuit 105 connected through a resistor 12 1 to ground and input 12 connected through a resistor 122 to ground. Inputs 6 and 7 are interconnected by a capacitor 123 and finally output 4, is connected to the bases of a common collector transistor amplifier (emitter follower)

including transistors 124 and 125. The emitters of each transistor are connected through a capacitor 126 to an inductor 128 and through a capacitor 127 to ground. Inductor 128 is connected to the primary of an output transformer 130. The secondary of the output transformer is connected to the loop antenna 200.

The transmitter 120 (FIG. 5) is seen to comprise the voltage controlled oscillator (VCO 84) portion of the PLL integrated circuit 105. The center frequency preferably is nominally 40 kHz with a nominal frequency deviation of 10 kHz peak to peak, i.e., 25%. The center frequency is determined by capacitor 123 and resistors 121 and 122, but primarily by resistor 122. Capacitor 123 is chosen to be physically smaller in capacitance than the manufacturer's recommendations so that minimum current is consumed. The consequence is poorer waveform and poorer frequency stability and reproducibility from unit to unit. However, an advantage of this invention is the wide latitude of acceptable frequencies which is permitted by the receiver design, as will be described. Resistor 121 in combination with capacitor 123 sets the frequency deviation for a given amplitude of audio available from the audio oscillator. Any DC offset from the audio oscillator 110 also sets a component of the center frequency.

The output from VCO 84 at output 4 in a PLL is normally connected to a phase comparator, but according to this invention it is passed to an emitter follower power booster, transistors 124 and 125, thence to a series resonant filter. The series resonant filter comprises capacitors 126 and 127, inductor 128, transformer 130 and the wire loop antenna 200. The series resonant circuit serves to isolate the DC component of the output of the power booster and to reduce the charging spikes from the high frequency components of the square wave output. A resistor may be applied across the circuit to decrease the "Q" if needed for the broad band of frequencies in the FM signal, although it was not necessary in this realization of the circuit. Further, the inductor 128 may be incorporated into the transformer 130 in the form of "leakage inductance". Those skilled in the art of transformer design can accomplish this as needed for miniaturization and cost reduction. Transformer 130 converts the low impedance of the single turn antenna loop 200 to a value that draws the desired power from the transmitter.

The wire loop antenna 200 may comprise a single turn of No. 30 gauge insulated copper wire, to be configured by the pet owner. Multiple turns may be used, although such is inconvenient to install. Heavier or lighter gauge wire may be used; No. 30 is easy to hide yet not too fragile. Too light a gauge may limit the power because of resistive losses, especially for large area loops.

Receiver 500

Figure 6:
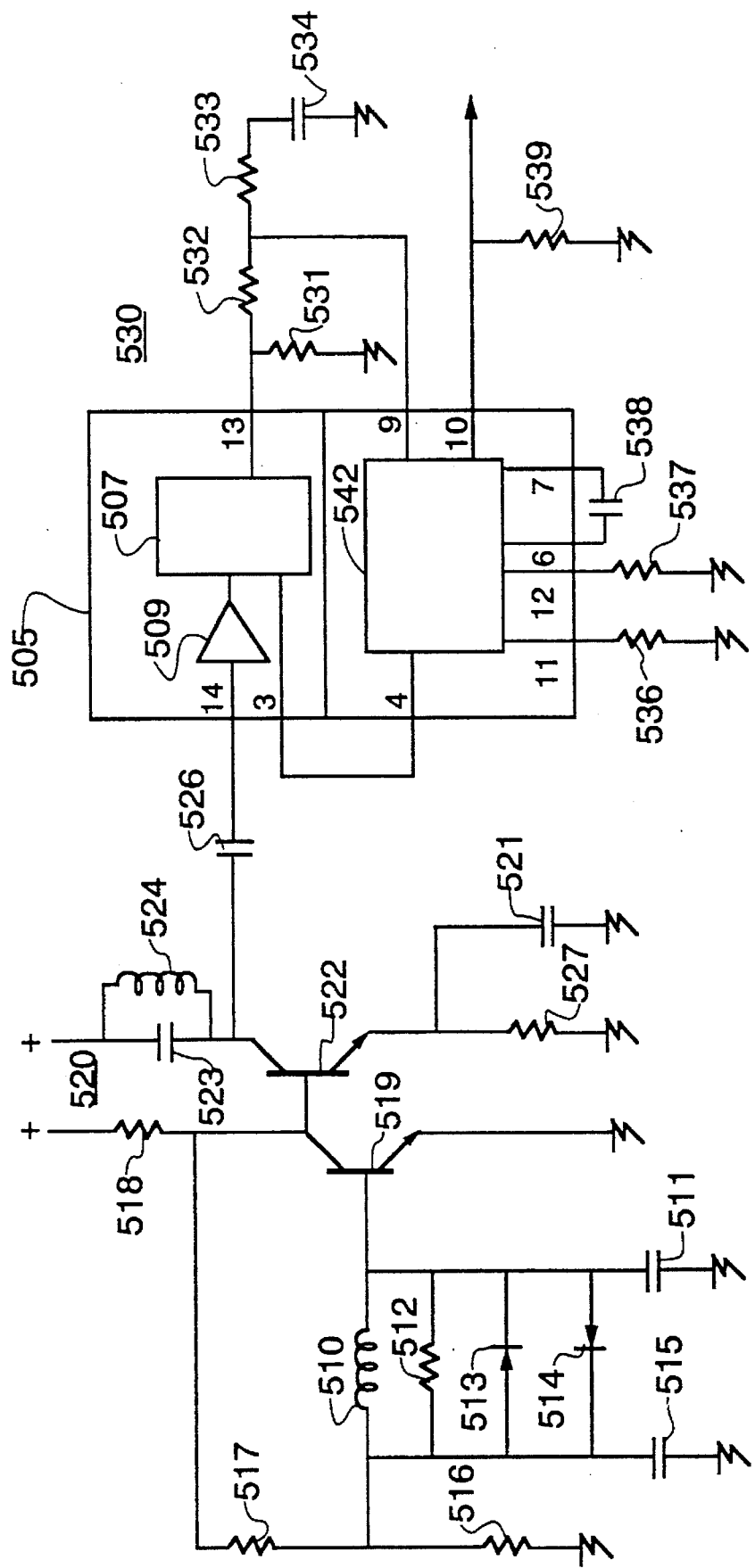
FIG. 6 is a partial block, partial schematic diagram of an RF amplifier and FM demodulator that may be used in conjunction with the receiver system illustrated in FIG. 3.

FIG. 6 shows a partial block and partial schematic detail of the pickup coil 510, the RF amplifier 520 and FM detector 530 of the receiver 500 (FIG. 3). The RF amplifier 520 may be constructed from two elements of a five-transistor array integrated circuit MC3346. This array has good gain at the operating frequency and low current, nominal 10 microamps. The two transistors are depicted as 519 and 522. Transistor 519 has its emitter connected to ground and is connected through a resistor 518 to a power supply and through a resistor 517 and 516 to ground. The junction of resistors 516 and 517 is connected through the pickup coil 510 of the antenna circuit to the base of the transistor 519. The antenna circuit also includes the pickup coil 510 (FIGS. 3 and 6) connected in parallel with a resistor 512 and two back-to-back connected diodes 513 and 514 and either side of the pickup coil 510 is connected through a capacitor 515 and a capacitor 511 to ground.

The collector of the transistor 519 is connected to the base of the transistor 522 whose emitter is connected to a resistor 527 to ground and a parallel connected capacitor 52 1 to ground. The collector of the transistor 522 is connected through a parallel connected capacitor 523 and inductor 524 to the power supply and through a capacitor 526 to the input 14 of the FM detector 530. The FM detector 530 is an integrated circuit 505 phase locked loop using an unconventional filter connected to a type II phase comparator as will be described below.

The base current of transistor 519 of the RF amplifier 520 is established by resistors 516 and 517. Capacitor 515 bypasses the RF signal feedback from the collector of transistor 519. Capacitor 515 may also be used in conjunction with the inductor or pickup coil 510 and capacitor 511 of the antenna circuit to "neutralize" the amplifier. The low currents used here could lead to phase shifts and high impedances such that capactive feedback from the collector to the base can destabilize the amplifier. While neutralization is conventionally applied above 1 MHz, it may be applied in this application. Capacitor 511 is dominant in setting the frequency band of the antenna circuit. It is understood that capacitance 515 of FIG. 3 may be comprised of 511 and 519 of FIG. 6 in series and that stray wiring capacitance and the Miller capacitance of transistor 519 will also contribute. Resistor 512 is used to control the bandwidth of the antenna circuit. Diodes 513 and 514 protect the circuit from spikes of energy. Resistor 518 is the collector load resistor. The signal at resistor 518 is direct coupled to the second stage 522. The current in transistor 522 is set by resistor 527 and capacitor 521 bypasses the RF signal to maintain high RF gain. The collector load is provided by the parallel combination inductor 524 and capacitor 523. The parallel combination, preferably in parallel with a resistor (not shown) to control bandwidth, provides the RF output which is coupled to the FM detector 530 by capacitor 526.

The FM detector 530 (FIGS. 3 and 6) uses an integrated circuit phase locked loop (PLL) 505, preferably the generic 4046, having phase comparator 507 connected to receive the output of the RF amplifier 520 at the input 14 of integrated circuit 505, which is applied through the Schmitt Trigger 509. The output of the phase comparator 507 is coupled from terminal 13 through a filter, constructed in accordance with this invention, including resistors 531, 532 and 533 and capacitor 534 to terminal 9 of the chip 505, i.e., to the VCO 542. The output of the VCO, terminal 4 is coupled via terminal 3 to the phase comparator 507. The VCO output, terminal 10, is coupled to the response selector 540 (FIG. 3).

In order to best understand the features of the PLL as used in this invention, a short digression is appropriate. The generic 4046 is a CMOS PLL. It features the low power linear voltage-controlled oscillator VCO 542 and two different phase comparators having a common signal input amplifier and Schmitt trigger. Phase comparator Type I is an XOR type that provides good noise rejection but unfortunately may lock on to harmonics and with its use the VCO 542 idles near mid-frequency in the absence of any signal thus consuming power.

Therefore, a type II phase comparator 507 is used in this invention to great advantage. It is an edge-controlled digital memory network that approximates an up-down counter. The output is controlled to be open circuited and is switched high or low when the phase is different from zero. The phase difference between the signal and VCO inputs to the Type II phase comparator is approximately zero in steady state operation. It does not lock on to harmonics but is susceptible to noise. The VCO idle frequency is low, including off, i.e., no oscillations. Some enhanced versions of the 4046 include a third phase comparator of the RS flip-flop type, which gives moderate noise rejection, does not lock on to harmonics, and idles at the lowest frequency. Because of the desire to reduce current consumption it is desirable to use a phase detector that idles at the lowest frequency, preferably zero. However, the low carrier frequency compared to the audio modulating frequency can make the noise susceptibility a problem.

Thus, in accordance with the invention, the type II phase comparator 507 was provided with a novel filter described below and the PLL draws current only when the input signal is sufficient to activate the Schmitt trigger 509 feeding the phase comparator 507. The current through load resistor 531 drags the output voltage low causing the VCO phase to lag the input. The lag causes an output pulse from the phase comparator 507 of sufficient width to make up for the current drag. In effect, the pulse width now can vary continuously in response to noise. Phase noise in the input signal now results in jitters in the width of the output pulse which is easy to filter. A conventional type II phase comparator would switch high for nearly a whole cycle then low for nearly a whole cycle. The long duration pulses are difficult to filter out when the audio is so close to the carrier. The circuit of this invention acts like an RS phase detector but has the advantage of having its output open circuited during most of the cycle resulting in less RF component to filter out of the phase detector output.

Resistor 531 of the FM detector 530 provides the current drag, which is favorably zero in the absence of input signal to conserve power. Resistor 532, 533 and capacitor 534 provide a low pass filter at the output of the phase comparator 507 with some lead provided by 533. The lead permits faster tracking of the input signal and stabilizes the feedback loop against overshoot. The VCO frequency is set by resistor 536 and capacitor 538. Capacitor 538 is selected to be smaller than the manufacturer recommended so that the operating current is minimized. The consequence is variation from unit to unit in the exact control voltage at input 9, but this is of little concern since the feedback will compensate for such variations. Resistor 537 sets the idle frequency and is not used in this application so that the idle frequency is zero. This permits any carrier frequency to be detected between the idle frequency and the upper limit set by resistor 536 and capacitor 538. Hence, a wide latitude of transmitter frequencies can be received. The demodulated signal, audio, is developed across resistor 539 which is applied to the response selector 540 (FIG. 7).

Response Selector 540

Figure 7:
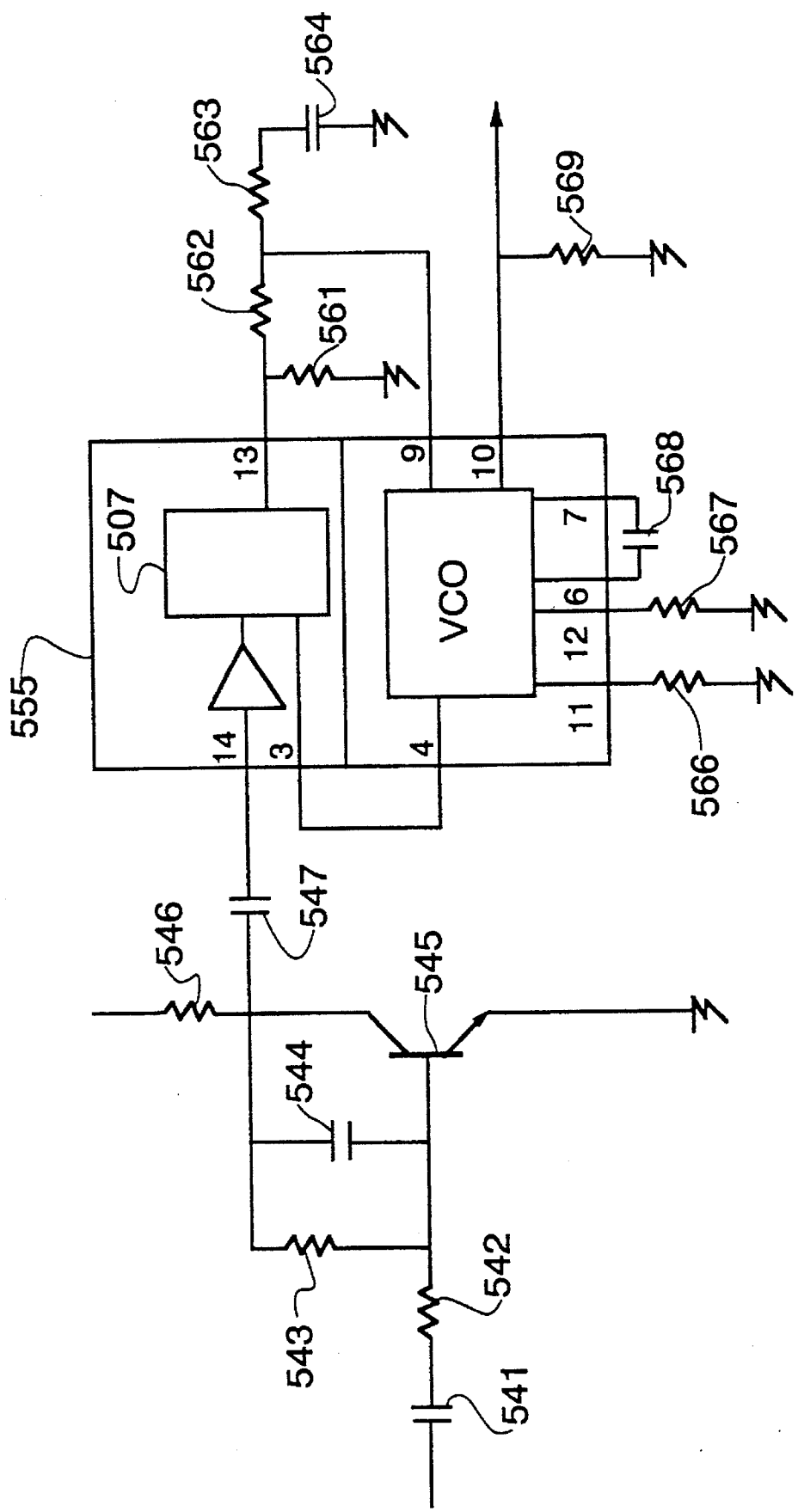
FIG. 7 is a partial block, partial schematic diagram of a portion of a response selector that may be used in conjunction with the receiver system illustrated in FIG. 3.

FIG. 7 is a partial block diagram and partial schematic of an exemplary response selector 540 (FIG. 3). It is used to confirm that the RF signal was frequency modulated sufficiently in frequency deviation so as to discriminate against residual FM on an interferring source, such as a television, and by an audio signal of sufficiently high frequency to discriminate against noise from the PLL when the RF signal is almost captured. The voltage output of this circuit is proportional to the audio frequency so that different stimuli can be selected depending on the audio frequency that frequency modulates the carrier of the transmitter.

The output of the FM detector 530 is coupled to the response selector 540 (FIGS. 3 and 6). Thus the output of the FM detector 530, derived across the output resistor 539 (FIG. 6), is coupled through a capacitor 541 (FIG. 7) and a series resistor 542 to the base of a transistor 545. Transistor 545 is used as an active filter that gives a voltage gain of approximately 5 with a bandwidth from approximately 200 Hz to 8 KHz. The base is connected to the collector electrode of the transistor through parallel connected resistor 543 and capacitor 544. The collector is also connected to a resistor 546 to a power source and through a capacitor 547 of a phase locked loop 555 using typically a 4046, PLL.

The phase locked-loop 555 is similar to that used in the FM detector 530 (FIG. 6) which has a type II phase comparator 507 having an output filter 561–564 like 541–544 of FIG. 6 for maintaining a phase difference between the output and input of the phase locked loop 555, thereby to provide very low power consumption in the PLL 555 when in idle, i.e., in the absence of audio signal from the FM detector. The output of the response selector 540 is substantially DC and is proportional to the audio frequency input. The emitter electrode of the transistor 545 is connected to ground. The phase lock loop terminals 6 and 7 are connected by capacitor 568 and the inputs 11 and 12 are connected through resistors 566 and 567 to ground. Output 13 is connected to ground through a resistor 561 and through a resistor 562 and 563 and capacitor 564 to ground. The junction of resistors 562 and 563 is connected to input 9. The output of the response selector 540 is taken from output 10 which is connected to ground through a resistor 569.

Capacitor 541 and resistor 542 form a differentiator while capacitor 544 and resistor 543 form an integrator. Thus the low frequency gain falls because of the differentiator and the high frequency gain falls because of the integrator. The mid-frequency gain is affected by the ratio of resistors 542 to 543. The output is developed across collector load resistor 546 and is coupled to the PLL 555 by capacitor 547. The current drag, as described for resistor 531 in FIG. 6, is provided by resistor 561 while resistors 562, 563 and capacitor 564 form the low pass filter. The frequency range and output sensitivity is set by resistor 566 and capacitor 568. Resistor 567 is used to set the lowest frequency to be accepted to produce an output. The output is applied to a first threshold circuit 550 (FIG. 3), that activates the audio alarm. The output is also applied to a second threshold circuit 560 (FIG. 3) which activates the electric shocker at some possibly higher input threshold than 550 or with some time delay.

The details of the threshold circuits and stimuli generators, audio alarm and electric shocker, are known to those known in the art and need no further description. As descibed above, those of the type described in U.S. Pat. Nos. 4,202,293, 4,802,482 or 5,054,429 may be used.

Non-Coplanar Antennas

A useful feature of FM is that the amplitude of the recovered audio fa is independent of the RF amplitude, provided the RF amplitude is above the reception threshold. In a system that overcomes directionality of the receiving antennas, multiple receivers having non-coplanar antennas will each provide equal audio amplitudes for each antenna providing an RF signal above the reception threshold. If three non-coplanar antennas are mutually orthogonal, then at least one receiver will provide an audio signal whenever the system is proximate the transmitting loop. These audio signals can be summed at the input of the response selector 540 (FIG. 7), i.e. at the base of transistor 545. This simply involves second and third receivers (not shown) connected to the input of the response selector, i.e., to the base of transistor 545, each through series connected capacitors and resistors analogous to capacitor 541 and resistor 542.

Alternative Transmitter

Figure 8:
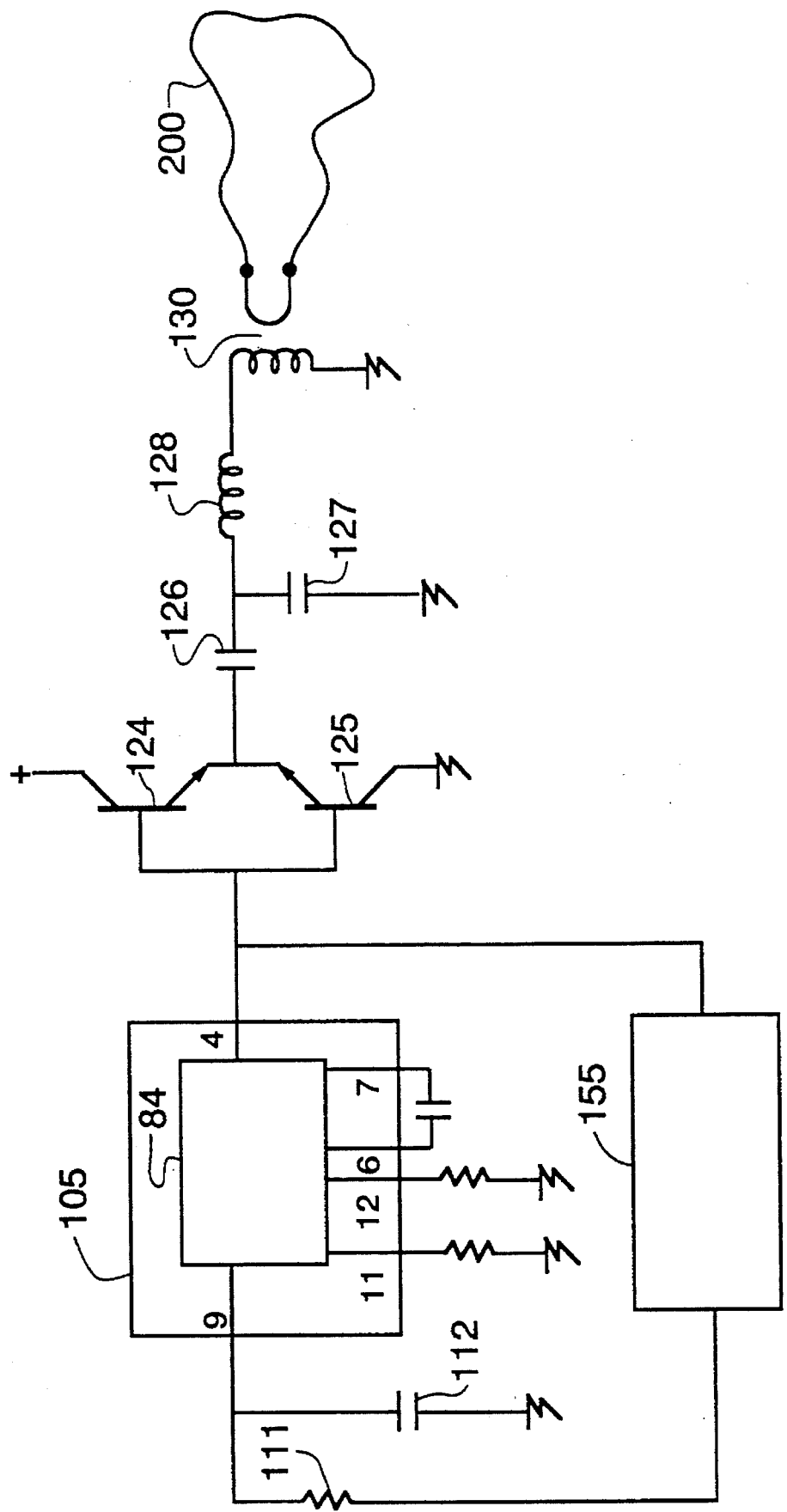
FIG. 8 is a partial block, partial schematic diagram of a modified FIG. 5 having an alternative audio generator.

In an alternative embodiment of this invention, shown in FIG. 8, the phase comparator of the transmitter of FIG. 5 and its associated resistors and capacitors need not be used. Instead, the audio generator 110 comprises a 12-stage binary counter 155 such as the integrated circuit 4040B and may be connected between inputs 4 and 9 of the PLL 105 44(FIGS. 5 and 8) which includes VCO 84, with the input 9 being connected through an RC filter 111, 112 from the counter output. This insures the modulating audio frequency fa is always a known submultiple of the carrier frequency fc. The remaining components serve the same function as described for transmitter 120 (FIG. 5).

Alternatively, integrated circuit 155.(FIG. 8) may be a remote control encoder such as Motorola MC145026 or SC41342 to generate a pulse code corresponding to a selectable input code. A complimentary remote control decoder at the receiver recovers the selected code so that a selected response or warning may be given to the animal.

The invention described has many advantages. Both the transmitter and the receiver are operable at low power so that long life is achieved with lightweight batteries. The antenna 200 is easy to install. The use of FM minimizes the interference with other sub-broadcast frequency systems and minimizes the interference from other systems as well as from harmonics of the power line. The low power consumed by the transmitter permits its use to protect a second animal from a first animal, wearing the receiver. The differing stimuli according to the audio modulating frequency permits different stimuli according to differing transmitters, i.e., different areas may have different warnings to the animal. A conventional integrated circuit PLL is adapted to give good noise rejection yet idle at very low power.

We claim:

1. A system for controlling the movement of a first object relative to a controlled area comprising:

a first radio frequency transmitter generating a radio frequency signal, said transmitter including means for frequency modulating the radio frequency signal with an audio frequency signal fa to provide a frequency modulated signal having a frequency deviation fd and a carrier frequency fc, a transmitting antenna coupled to the first transmitter radiating the frequency modulated signal and defining the controlled area, and a first receiver associated with the first object, the receiver having a receiving antenna receiving the radiated signal and a demodulator means for demodulating said received radiated signal to recover the signal fa, and a response selector means for providing an alarm signal in response to the recovered signal fa, the demodulator means comprising a phase locked loop having means for activating the phase locked loop to recover the signal fa and provide the alarm signal only when the amplitude of the received radiated signal exceeds a predetermined amplitude, thereby reducing power required by the receiver.

2. The system set forth in claim 1 improved by having the carrier frequency fc in the frequency range 10 KHz to 500 KHz.

3. The system set forth in claim 1 improved by having the carrier frequency deviation fd in the range 1% to 50%.

4. The system set forth in claim 1 improved by having the audio frequency fa in the range 100 Hz to 10 KHz, therby to permit quick response and to reduce the system's susceptibility of interfering noise.

5. The system set forth in claim 1 wherein the phase locked loop has a phase comparator which is an edge-controlled digital memory network having a load resistor, the phase comparator having an output that is normally open connected to the load resistor to create a phase shift, thereby to reduce the audio noise generated by phase jitter in the received radiated signal.

6. The system set forth in claim 1 wherein the first transmitter has an integrated circuit "PLL" comprising an XOR gate with a Schmitt-trigger input and a voltage-controlled oscillator operating at the carrier frequency fc, means for connecting the XOR gate as an astable oscillator operating at said audio frequency fa, the XOR gate being connected to frequency modulate the voltage-controlled oscillator frequency with said audio frequency fa, thereby to produce the frequency modulated signal.

7. The system set forth in claim 1 wherein the first object is a first animal and the controlled are a is a second animal.

8. The system set forth in claim 1 wherein the response selector comprises a phase locked loop having an input and output and a type II phase comparator with an output filter, said phase comparator having means including an output filter for maintaining a phase difference between the input and the output of the phase locked loop.

9. A system set forth in claim 1 wherein the phase locked loop has a type II phase comparator with an output filter, said phase comparator having means including an output filter for maintaining a phase difference between the input and the output of the phase locked loop, thereby to provide very low power consumption in the phase locked loop when in idle, the phase locked loop responding only to the received radio frequency signal exceeding a predetermined level.

10. The system set forth in claim 1 wherein the first receiver response selector means is normally off and also has the means responsive to the amplitude of the recovered signal fa being greater than a predetermined amplitude for activating the response selector, thereby reducing the power required by the receiver.

11. The system system set forth in claim 10 wherein the response selector means comprises a phase locked loop having a type II phase comparator with an output filter, said phase comparator having means including an output filter for maintaining a phase difference between the input and the output of the phase locked loop, thereby to provide very low power consumption in the phase locked loop when idle, the phase locked loop responding only to the recovered audio signal fa exceeding a predetermined level.

12. A system for controlling the movement of a first object relative to a controlled area comprising:

a first radio frequency transmitter generating a radio frequency signal, said transmitter including means for frequency modulating the radio frequency signal with an audio frequency signal fa to provide a frequency modulated signal having a frequency deviation fd and a carrier frequency fc, a transmitting antenna coupled to the first transmitter radiating the frequency modulated signal and defining the controlled area, and a first receiver associated with the first object, the receiver having a receiving antenna receiving the radiated signal and a demodulator means for demodulating said received radiated signal to recover the signal fa, and a response selector means for providing an alarm signal in response to the recovered signal fa, the first receiver response selector means is normally off and also has the means responsive to the amplitude of the recovered signal fa being greater than a predetermined amplitude for activating the response selector, thereby reducing the power required by the receiver.

* * * * *